United States Patent

Numa et al.

[11] Patent Number: 5,198,503
[45] Date of Patent: Mar. 30, 1993

[54] CURABLE COMPOSITION

[75] Inventors: Nobushige Numa, Ebina; Kaoru Morita; Yasushi Nakao, both of Hiratsuka, all of Japan

[73] Assignee: Kansai Paint Company, Limited, Amagasaki, Japan

[21] Appl. No.: 617,309

[22] Filed: Nov. 20, 1990

Related U.S. Application Data

[63] Continuation of Ser. No. 488,446, Feb. 27, 1990, abandoned, which is a continuation of Ser. No. 245,436, Sep. 16, 1988, abandoned.

[30] Foreign Application Priority Data

Sep. 17, 1987 [JP] Japan .............................. 62-234508
Oct. 6, 1987 [JP] Japan .............................. 62-253238

[51] Int. Cl.$^5$ .......................................... C08F 255/02
[52] U.S. Cl. .................................. 525/288; 525/364; 525/365; 525/326.2; 525/329.1; 525/330.3; 525/330.5
[58] Field of Search ............. 526/279; 525/326.2, 525/288, 364, 365; 524/730, 731

[56] References Cited

U.S. PATENT DOCUMENTS 4,369,289 1/1983 Keogh ........................... 525/288
4,772,672 9/1988 Isozaki et al. ................... 526/279

FOREIGN PATENT DOCUMENTS 2101138 1/1983 United Kingdom ............... 525/288

*Primary Examiner*—John C. Bleutge
*Assistant Examiner*—Mark Sweet
*Attorney, Agent, or Firm*—Armstrong, Westerman, Hattori, McLeland & Naughton

[57] ABSTRACT

A curable composition characterized in that the composition comprises:

(a) a nonaqueous dispersion of a particulate polymer insoluble in an organic liquid and prepared by polymerizing a radical-polymerizable unsaturated monomer in the organic liquid in the presence of a dispersion stabilizer resin, the stabilizer resin being a polymer consisting essentially of an alkoxysilane-containing vinyl monomer which is a compound represented by the formula

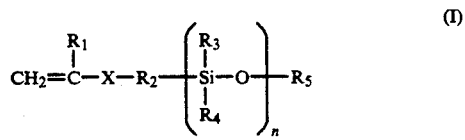

(I)

wherein X is

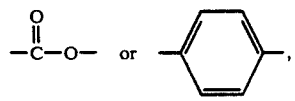

$R_1$ is a hydrogen atom or methyl, $R_2$ is a bivalent saturated aliphatic hydrocarbon group having 1 to 6 carbon atoms, $R_3$ and $R_4$ are the same or different and are each phenyl, alkyl having 1 to 6 carbon atoms or alkoxyl having 1 to 10 carbon atoms, $R_5$ is alkyl having 1 to 10 carbon atoms, and n is an integer of from 1 to 100; and a curing catalyst, or a chelate compound serving as a crosslinking curing agent admixed with the nonaqueous dispersion.

3 Claims, No Drawings

CURABLE COMPOSITION

This application is a continuation of application Ser. No. 488,446 filed Feb. 27, 1990, which is a continuation of parent application Ser. No. 245,436, filed Sep. 16, 1988 both now abandoned.

The present invention relates to curable compositions.

Conventional compositions which are curable by crosslinking at a relatively low temperature of from room temperature to 100° C. include those comprising an alkoxysilane-containing acrylic resin and a tin-containing compound or like curing catalyst (Unexamined Japanese Patent Publication SHO 58-136606) and those comprising the acrylic resin and an aluminum chelate compound (Unexamined Japanese Patent Publication SHO 60-67553).

However, these known compositions have the drawback of being not always satisfactory, for example, in storage stability and the mechanical characteristics of the resulting coating although excellent in curability at low temperatures and the chemical resistance and water resistance of the coating. When high mechanical characteristics are required, for example in respect of resistance to impact and bending, improvements in these characteristics are limited when attempted merely by selecting a suitable kind of curing catalyst or aluminum chelate compound and adjusting the amount of thereof, the content of alkoxysilane groups, the molecular weight of the acrylic resin, etc. Accordingly, the compositions have the drawback of being limited in use and not fully satisfactory in storage stability, the surface state and weather resistance of the coating, etc.

An object of the present invention is to provide a novel curable composition free of the above drawback.

Another object of the invention is to provide a novel composition which is curable at low temperatures, has high storage stability and gives coatings having a satisfactory surface, high resistance to chemicals, water, weather, etc. and high mechanical characteristics.

These and other objects of the invention will become apparent from the following description.

The present invention provides a curable composition characterized in that the composition comprises:

(a) a nonaqueous dispersion of a particulate polymer insoluble in an organic liquid and prepared by polymerizing a radical-polymerizable unsaturated monomer in the organic liquid in the presence of a dispersion stabilizer resin, the stabilizer resin being a polymer consisting essentially of an alkoxysilane-containing vinyl monomer which is a compound represented by the formula

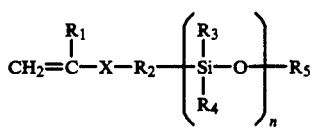

(I)

wherein X is

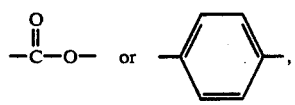

$R_1$ is a hydrogen atom or methyl, $R_2$ is a bivalent saturated aliphatic hydrocarbon group having 1 to 6 carbon atoms, $R_3$ and $R_4$ are the same or different and are each phenyl, alkyl having 1 to 6 carbon atoms or alkoxyl having 1 to 10 carbon atoms, $R_5$ is alkyl having 1 to 10 carbon atoms, and n is an integer of from 1 to 100; and (b) a curing catalyst, or a chelate compound serving as a crosslinking curing agent admixed with the nonaqueous dispersion.

The research conducted by the present inventor has revealed that the above drawback of the prior art can be overcome by preparing a nonaqueous dispersion of the above-specified particulate polymer using the alkoxysilane-containing polymer specified above as a dispersion stabilizer resin, and admixing with the dispersion a curing catalyst or a chelate compound serving as a crosslinking curing agent. In fact, the research has revealed the novel surprising finding that the composition thus obtained is satisfactorily curable at low temperatures, has high storage stability and gives coatings which have an excellent surface, high resistance to chemicals, water and weather and high mechanical characteristics. The present invention has been accomplished based on the above finding.

The preferred embodiments of the invention include the following compositions (A) and (B).

Composition (A) comprising (a) a nonaqueous dispersion of a particulate polymer insoluble in an organic liquid and prepared by polymerizing a radical-polymerizable unsaturated monomer in the organic liquid in the presence of a dispersion stabilizer resin which is a polymer consisting essentially of an alkoxysilane-containing vinyl monomer of the formula (I), and (b) an acidic compound, basic compound or tin-containing compound, or a mixture of a tin-containing compound and an acidic compound or basic compound admixed with the dispersion and serving as a curing catalyst.

Composition (B) comprising (a) a nonaqueous dispersion of a particulate polymer insoluble in an organic liquid and prepared by polymerizing a radical-polymerizable unsaturated monomer in the organic liquid in the presence of a dispersion stabilizer resin which is a copolymer consisting essentially of an alkoxysilane-containing vinyl monomer of the formula (I) and a hydroxyl-containing unsaturated monomer, and (b) a chelate compound serving as a crosslinking curing agent and admixed with the dispersion.

Composition (B) of the invention has especially excellent curability at low temperature because the dispersion stabilizer resin comprises the hydroxyl-containing unsaturated monomer as another essential monomer and further because the composition comprises the chelate compound serving as a crosslinking curing agent.

The dispersion stabilizer resin to be used in the invention will now be described.

The above-specified polymer is used as the dispersion stabilizer resin for the curable composition (A) of the invention. The polymer comprises as its essential monomer the compound of the formula (I) wherein n is preferably 1 to 10.

With reference to the formula (I), the bivalent saturated aliphatic hydrocarbon having 1 to 6 carbon atoms and represented by $R_2$ is a straight-chain or branched-chain alkylene group, such as methylene, ethylene, propylene, 1,2-butylene, 1,3-butylene, 2,3-buthylene, tetramethylene, ethylethylene, pentamethylene, hexamethylene or the like. The alkyl group represented by $R_3$ and $R_4$ and having 1 to 6 carbon atoms is a straight-chain or branched-chain alkyl group, such as methyl, ethyl, n-propyl, isopropyl, n-butyl, isobutyl, sec-butyl, tert-butyl, n-pentyl, isopentyl, neopentyl, n-hexyl, isohexyl or the like. Examples of alkyl groups represented by $R_5$ having 1 to 10 carbon atoms are above-mentioned alkyl groups and further n-heptyl, 1-methylpentyl, 2-methylhexyl, n-octyl, n-nonyl, n-decyl and the like The alkoxyl group represented by $R_3$ and $R_4$ and having 1 to 10 carbon atoms is a straight-chain or branched-chain alkoxyl group, such as methoxy, ethoxy, n-propoxy, isopropoxy, n-butoxy, isobutoxy, sec-butoxy, tert-butoxy, n-pentoxy, isopentoxy, n-hexyloxy, isohexyloxy, n-octyloxy or the like. When n in the formula (I) is at least 2, the groups $R_3$, as well as groups $R_4'$ may be the same or different.

Of the compounds of the formula (I) for use in the invention, those wherein X is

are, for example, γ-(meth)acryloxyethyltrimethoxysilane, γ-(meth)acryloxypropyltrimethoxysilane, γ-(meth)acryloxypropyltriethoxysilane, γ-(meth)acryloxypropyltripropoxysilane, γ-(meth)acryloxypropylmethyldimethoxysilane, γ-(meth)acryloxypropylmethyldiethoxysilane, γ-(meth)acryloxy-propylmethyldipropoxysilane, γ-(meth)acryloxybutylphenyldimethoxysilane, γ-(meth)acryloxybutylphenyldiethoxysilane, γ-(meth)acryloxybutylphenyldipropoxysilane, γ-(meth)acryloxypropyldimethylmethoxysilane, γ-(meth)acryloxypropyldimethylethoxysilane, γ-(meth)acryloxypropylphenylmethylmethoxysilane, γ-(meth)acryloxypropylphenylmethylmethoxysilane,

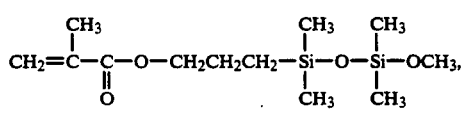

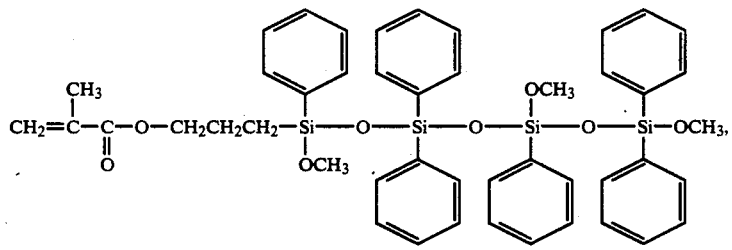

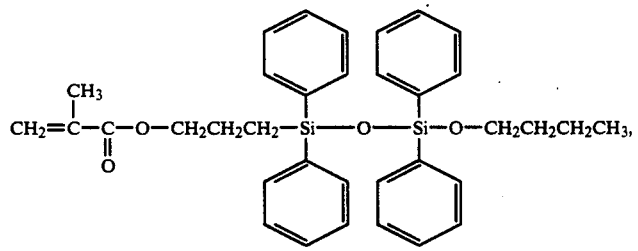

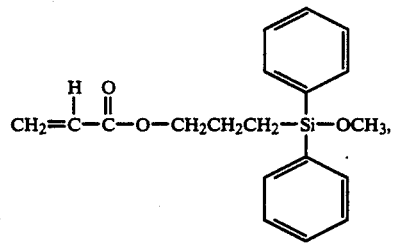

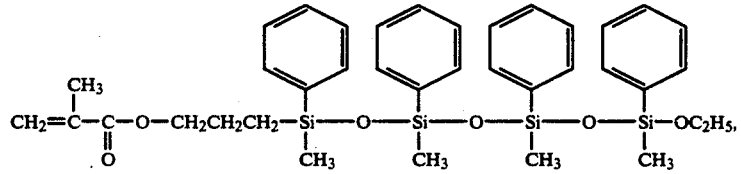

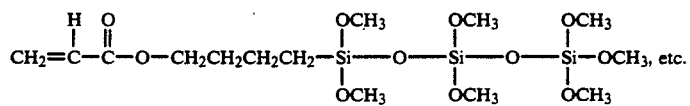

Further of compounds of the formula (I), those wherein X is

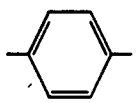

are, for example,

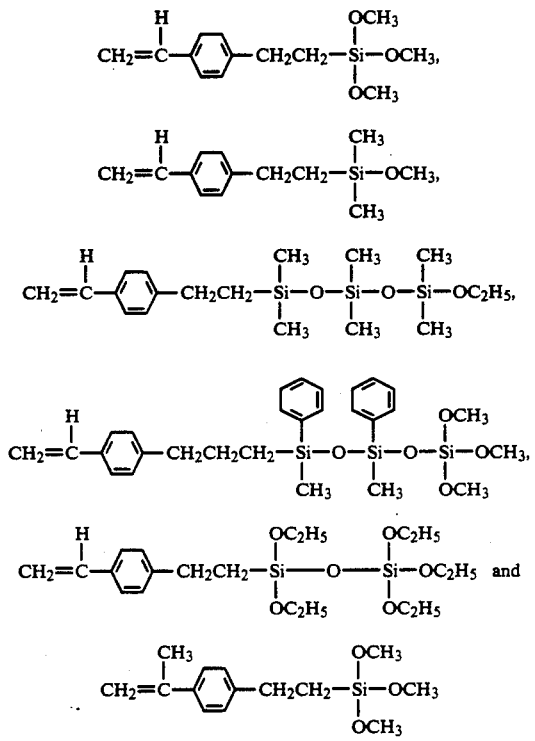

Preferable among the compounds of the formula (I) are acryloxypropyltrimethoxysilane, methacryloxypropyltriethoxysilane, methacryloxypropyltri-n-butoxysilane, acryloxypropylmethyldimethoxysilane, methacryloxypropylmethyldimethoxysilane, methacryloxypropylmethyldi-n-butoxysilane, etc.

The polymer for use as the dispersion stabilizer resin in preparing the composition (A) of the invention comprises at least one of the alkoxysilane-containing vinyl monomers represented by the formula (I) as its essential monomer component, and when required, other monomer copolymerized therewith. The proportion of the essential monomer to be used is usually about 1 to about 100 wt. %, preferably about 5 to about 30 wt. %, based on the combined amount of monomers used although widely variable. Proportions less than 1 wt. % are undesirable since the composition will then exhibit lower curability and form coatings of lower chemical and mechanical characteristics.

Other polymerizable monomers which are used for preparing the polymer when so required are suitably selectable according to the properties required of the coating. Long-chain vinyl monomers are suitable from the viewpoint of copolymerizability, solubility in the organic liquid, etc. Examples of preferred polymerizable monomers are $C_4$ to $C_{18}$ alkyl or cycloalkyl esters of (meth)acrylic acid such as n-butyl (meth)acrylate, isobutyl (meth)acrylate, tert-butyl (meth)acrylate, 2-ethylhexyl (meth)acrylate, cyclohexyl (meth)acrylate, n-octyl (meth)acrylate, lauryl (meth)acrylate, tridecyl (meth)acrylate, stearyl (meth)acrylate and cyclohexyl (meth)acrylate; alkoxyalkyl esters of (meth)acrylic acid such as methoxybutyl (meth)acrylate, methoxyethyl (meth)acrylate and ethoxybutyl (meth)acrylate; esters of an aromatic alcohol with (meth)acrylic acid such as benzyl (meth)acrylate; adducts of glycidyl (meth)acrylate or (meth)acrylic acid hydroxyalkyl ester with capric acid, lauric acid, linoleic acid, oleic acid or like monocarboxylic acid compound; adducts of (meth)acrylic acid with a monoepoxy compound such as "Cardura E10"; vinyl aromatic compounds such as styrene, α-methylstyrene, vinyltoluene, p-chlorostyrene and p-tert-butylstyrene; mono- or di-esters of an α,β-unsaturated carboxylic acid other than (meth)acrylic acid, such as itaconic acid, itaconic anhydride, crotonic acid, maleic acid, maleic anhydride, fumaric acid or citraconic acid, with a $C_4$ to $C_{18}$ monoalcohol, such as butyl alcohol, pentyl alcohol, heptyl alcohol, octyl alcohol or stearyl alcohol; fluorine-containing compounds such as "Viscoat 8F," "Viscoat 8FM," "Viscoat 3F" and "Viscoat 3FM" ((meth)acrylates having a fluorine atom on the side chain, brand names for products of Osaka Yuki Kagaku Co., Ltd.), perfluorocyclohexyl (meth)acrylate and perfluorohexylethylene; etc.

The above-specified copolymer is used as the dispersion stabilizer resin in preparing the curable composition (B) of the invention. The compound of the formula (I) serving as one of the essential monomers of the copolymer can be one of those exemplified above for the composition (A).

The hydroxyl-containing unsaturated monomer serving as the other essential monomer component of the specified copolymer for use as the dispersion stabilizer resin in preparing the composition (B) imparts enhanced hydrophilic properties to the copolymer to promote the hydrolysis of the alkoxysilane groups derived from the compound of the formula (I) and further affords the functional group to be reacted with the chelate compound as a crosslinking curing agent.

Examples of preferable hydroxyl-containing unsaturated monomers are $C_2$ to $C_8$ hydroxyalkyl esters of (meth)acrylic acid, such as 2-hydroxyethyl (meth)acrylate, 2-hydroxypropyl (meth)acrylate, 3-hydroxypropyl (meth)acrylate and hydroxybutyl (meth)acrylate; monoesters of a polyether polyol, such as polyethylene glycol, polypropylene glycol or polybutylene glycol, with an unsaturated carboxylic acid such as (meth)acrylic acid; monoethers of such a $C_2$ to $C_8$ hydroxyalkyl ester of (meth)acrylic acid and such a polyether polyol; adducts of such a $C_2$ to $C_8$ hydroxyalkyl ester of (meth)acrylic acid with a lactone such as ε-caprolactone or γ-valerolactone; adducts of an α,β-unsaturated carboxylic acid such as (meth)acrylic acid with a monoepoxy compound such as "Cardura E10" (composition comprising glycidyl ester of Versatic acid, brand name for product of Shell Chemical Co.), ethylene oxide, propylene oxide, butylene oxide or like α-olefin epoxide; adducts of glycidyl (meth)acrylate with a monobasic acid such as acetic acid, propionic acid, p-tert-butylbenzoic acid, lauric acid, stearic acid or like fatty acid; monoesters or diesters of an unsaturated compound containing an acid anhydride group, such as maleic anhydride or itaconic anhydride, with a glycol such as ethylene glycol, 1,6-hexanediol or neopentyl glycol; hydroxylalkyl vinyl ethers such as hydroxyethyl vinyl ether; chloride-containing compounds such as 3-chloro-2-hydroxypropyl (meth)acrylate; etc.

The copolymer for use as the dispersion stabilizer resin in preparing the present composition (B) consists essentially of at least one of the alkoxysilane-containing vinyl monomers represented by the formula (I) and at least one hydroxyl-containing unsaturated monomer. Usually, the proportions of these essential monomers are suitably as follows although selectively variably over wide ranges. Based on the combined amount of monomers used, the proportion of the monomer of the formula (I) is about 1 to about 99 wt. %, preferably about 5 to about 30 wt. %, and the proportion of the hydroxyl-containing unsaturated monomer is about 1 to about 99 wt. %, preferably about 3 to about 30 wt. %. When the proportion of the former is less than 1 wt. % (with that of the latter exceeding 99 wt. %), or when the proportion of the former exceeds 99 wt. % (with less than 1 wt. % of the latter), the composition tends to exhibit impaired curability and give coatings of lowered chemical and mechanical characteristics, hence undesirable.

For preparing the copolymer, other polymerizable monomers are further usable as required. Such monomers are suitably long-chain vinyl monomers from the viewpoint of copolymerizability, solubility in the organic liquid, etc., although suitably selectable according to the properties required of the coating. Examples of preferred other polymerizable monomers are those exemplified for the composition (A).

The polymerization for preparing the dispersion stabilizer resins for use in preparing the present compositions (A) and (B) can be effected usually using a radical polymerization initiator in the same manner for both the compositions. Examples of useful radical polymerization initiators are azo initiators such as 2,2'-azobisisobutyronitrile and 2,2'-azobis(2,4-dimethylvaleronitrile); peroxide initiators such as benzoyl peroxide, lauryl peroxide, tert-butyl peroctoate and tert-butylperoxy-2-ethyl hexanoate; etc. Such initiators are usable generally in an amount of about 0.2 to about 10 parts by weight, preferably 0.5 to 5 parts by weight, per 100 parts by weight of the monomer or monomers to be polymerized. The polymerization reaction is conducted usually at a temperature of about 60° to about 160° C. for about 1 to about 15 hours.

Generally, it is suitable that the polymer for use as the dispersion stabilizer resin in the present invention have a weight average molecular weight of about 5000 to about 100000 (about 1000 to about 60000 in number average molecular weight), preferably about 5000 to about 50000. If the molecular weight is less than about 5000, the particles dispersed will not be fully stabilized but are liable to agglomerate or settle, whereas if the molecular weight exceeds about 100000, the dispersion becomes exceedingly viscous and difficult to handle, hence undesirable.

For use in the present invention, the dispersion stabilizer resin may be used singly, or at least two of such resins, which differ in the copolymer composition or in molecular weight, may be used in combination. Further when required, the resin is usable conjointly with a small amount of other dispersion stabilizer such as butyletherified melamine-formaldehyde resin, alkyd resin, or common acrylic resin which does not contain the compound of the formula (I) as its copolymer component.

According to the present invention, a radical-polymerizable unsaturated monomer is polymerized in an organic liquid in the presence of the dispersion stabilizer resin to prepare a nonaqueous dispersion of a particulate polymer insoluble in the organic liquid.

The organic liquids useful for the polymerization include those in which the dispersed particulate polymer resulting from the polymerization are substantially insoluble and which are good solvents for the stabilizer resin and the radical-polymerizable unsaturated monomer. Examples of such organic liquids are aliphatic hydrocarbons including hexane, heptane and octane; aromatic hydrocarbons including benzene, toluene and xylene; alcohols including methyl alcohol, isopropyl alcohol, n-butyl alcohol, isobutyl alcohol and octyl alcohol; ethers including cellosolve, butyl cellosolve, diethylene glycol monobutyl ether; ketones including methyl isobutyl ketone, diisobutyl ketone, methyl ethyl ketone, methyl hexyl ketone and ethyl butyl ketone; esters including ethyl acetate, isobutyl actate, amyl acetate and 2-ethylhexyl acetate; etc. These organic liquid may be used singly, or at least two of them are usable in admixture. Generally, it is suitable to use an aliphatic hydrocarbon chiefly in combination with an aromatic hydrocarbon, alcohol, ether, ketone or ester.

The radical-polymerizable unsaturated monomer to be subjected to the polymerization is preferably one highly amenable to polymerization and having a smaller number of carbon atoms than the monomer component of the dispersion stabilizer resin since dispersed polymer particles can then be formed easily. Examples of such monomers are $C_1$ to $C_{18}$ alkyl or cycloalkyl esters of (meth)acrylic acid such as methyl (meth)acrylate, ethyl (meth)acrylate, propyl (meth)acrylate, n-butyl (meth)acrylate, isobutyl (meth)acrylate, tert-butyl (meth)acrylate, 2-ethylhexyl (meth)acrylate, cyclohexyl (meth)acrylate, n-octyl (meth)acrylate, lauryl (meth)acrylate, tridecyl (meth)acrylate and stearyl (meth)acrylate; alkoxyalkyl esters of (meth)acrylic acid such as methoxybutyl (meth)acrylate, methoxyethyl (meth)acrylate and ethoxybutyl (meth)acrylate; esters of (meth)acrylic acid and aromatic alcohols such as benzyl (meth)acrylate; adducts of glycidyl (meth)acrylate with a $C_2$ to $C_{18}$ monocarboxylic acid such as acetic acid, propionic acid, oleic acid or p-tert-butylbenzoic acid; adducts of (meth)acrylic acid with "Cardura E10" or like monoepoxy compound; vinyl aromatic compounds such as styrene, α-methylstyrene, vinyltoluene, p-chlorostyrene and p-tert-butylstyrene; mono- or di-esters of an α,β-unsaturated carboxylic acid other than (meth)acrylic acid, such as itaconic acid, itaconic anhydride, crotonic acid, maleic acid, maleic anhydride, fumaric acid or citraconic acid, with $C_1$ to $C_{18}$ monoalcohol, such as methyl alcohol, butyl alcohol, hexyl alcohol or stearyl alcohol; fluorine-containing compounds such as "Viscoat 8F," "Viscoat 8FM," "Viscoat 3F" and "Viscoat 3FM" (brand names for (meth)acrylates having a fluorine atom on the side chain, products of Osaka Yuki Kagaku Co., Ltd.), perfluorocyclohexyl (meth)acrylate and perfluorohexylethylene; cyano-containing unsaturated compounds such as (meth)acrylonitrile; vinyl esters such as vinyl acetate, vinyl benzoate and "VEOVA" (product of Shell Chemical Co.); vinyl ethers such as n-butyl vinyl ether, ethyl vinyl ether and methyl vinyl ether; di(meth)acrylate of 1,6-hexanediol, tri(meth)acrylate of trimethylolpropane, divinylbenzene and like polyvinyl compounds; ethylene, propylene, vinyl chloride, vinylidene chloride and like α-olefin compounds; etc. As already stated, the monomer component for forming the particulate polymer is preferably one having a smaller number of carbon atoms than the monomer component of the dispersion stabilizer resin. This assures the formation of particles with good stability. Especially preferable from this viewpoint are (meth)acrylic acid esters up to 8, preferably up to 4, in the number of carbon atoms, vinyl aromatic compounds and (meth)acrylonitrile.

These radical-polymerizable unsaturated monomers are used singly, or at least two of them can be used in suitable combination.

The radical-polymerizable unsaturated monomer is polymerized usually using a radical polymerization initiator. Examples of radical polymerization initiators usable are azo initiators such as 2,2'-azobisisobutyrousable nitrile and 2,2'-azobis(2,4-dimethylvaleronitrile); peroxide initiators such as benzoyl peroxide, lauryl peroxide, tert-butyl peroctoate and tert-butylperoxy-2-ethyl hexanoate; etc. These initiators can be used in an amount of about 0.2 to about 10 parts by weight, preferably 0.5 to 5 parts by weight, per 100 parts by weight of the monomer to be polymerized.

The proportion of the dispersion stabilizer resin to be present in the polymerization system is variable over a wide range, for example, according to the kind of resin used. Generally, it is suitable to use about 3 to about 240 parts by weight, preferably 5 to 82 parts by weight, of the radical-polymerizable unsaturated monomer per 100 parts by weight of the stabilizer resin. The combined concentration of the stabilizer resin and the radical-polymerizable unsaturated monomer in the organic liquid is generally about 30 to about 70 wt. %, preferably 30 to 60 wt. %.

The polymerization is effected in a known manner. The reaction temperature for the polymerization is usually about 60 to about 160° C. The reaction usually takes about 1 to about 15 hours.

In this way, a stable nonaqueous dispersion is obtained wherein the liquid phase is the organic liquid having the stabilizer resin dissolved therein, and the solid phase is polymer particles formed by the polymerization of the radical-polymerizable unsaturated monomer. The particulate polymer is usually in the range of about 0.1 to about 1.0 μm in particle size. Particle sizes smaller than this range are not desirable since the composition has a higher viscosity, while particles sizes larger than this range are not desirable either since the particles will swell or agglomerate during storage.

According to the present invention, the dispersion stabilizer resin and the polymer particles can be bonded together is contained in the organic liquid, whereby further improvements can be achieved in storage stability and mechanical characteristics. When the resin and the particulate polymer are thus bonded together, the dispersion appears almost unchanged, with the polymer remaining within the above-mentioned range of particle sizes.

The dispersion stabilizer resin can be bonded to the particulate polymer, for example, by partially copolymerizing with the alkoxysilane-containing vinyl monomer a monomer component having a functional group such as hydroxyl group, acid group, acid anhydride group, epoxy group, methylol group, isocyanate group, amide group or amino group during the step of preparing the stabilizer resin, and further using a monomer having a functional group reactive with the above functional group, such as hydroxyl group, acid group, acid anhydride group, epoxy group, methylol group, isocyanate group, amide group or amino group, as a monomer component for forming the particulate polymer. Examples of combinations of reactive groups are isocyanate group and hydroxyl group, isocyanate group and methylol group, epoxy group and acid (anhydride) group, epoxy group and amino group, isocyanate group and amide group, acid (anhydride) group and hydroxyl group, etc.

Examples of useful monomers having such a functional group are $\alpha,\beta$-ethylenically unsaturated carboxylic acids including (meth)acrylic acid, crotonic acid, maleic acid, maleic anhydride, itaconic acid, itaconic anhydride, fumaric acid and citraconic acid; glycidyl-containing compounds such as glycidyl (meth)acrylate, vinyl glycidyl ether and allyl glycidyl ether; carboxylic acid amide compounds such as (meth)acrylamide, N,N-dimethyl(methy)acrylamide, N-alkoxymethylated (meth)acrylamide, diacetoneacrylamide and N-methylol(meth)acrylamide; sulfonic acid amide-containing compounds such as p-styrenesulfonamide, N-methyl-p-styrenesulfonamide and N,N-dimethyl-p-styrenesulfonamide; amino-containing compounds such as (meth)acrylic acidtert-butylaminoethyl; phosphoric acid group-containing compounds such as condensation product of 2-hydroxyethyl (meth)acrylate and phosphoric acid or phosphoric acid ester, and glycidyl (meth)acrylate or like glycidylcontaining compound having phoshoric acid or an ester thereof adducted to its glycidyl group; sulfonic acid group-containing compounds such as 2-acrylamide-2-methylpropanesulfonic acid; isocyanate-containing compounds such as equimolar adduct of m-isopropenyl-$\alpha,\alpha$-dimethylbenzyl isocyanate, isophorone diisocyanate or tolylene diisocyanate with hydroxy (meth)acrylate and isocyanoethyl methacrylate; etc.

Alternatively, the dispersion stabilizer resin can be bonded to the particulate polymer by introducing a polymerizable double bond into the stabilizer resin and polymerizing the radical-polymerizable unsaturated monomer in the presence of the resulting resin. The polymerizable double bond can be introduced into the stabilizer resin by using carboxylic acid, phosphoric acid, sulfonic acid or like acid group-containing monomer as a copolymerizable component of the resin and reacting glycidyl (meth)acrylate, allyl glycidyl ether or like glycidyl-containing unsaturated monomer with the acid group. Conversely, it is also possible to cause the resin to contain glycidyl first and react an acid group-containing monomer with the resin. These reactions can be carried out under known conditions.

The dispersion stabilizer resin can be bonded to the particulate polymer by another method, i.e., by preparing a nonaqueous dispersion containing the resin and the polymer, each having introduced therein a functional group non-reactive with the functional group in the other, and admixing with the dispersion an agent for bonding the resin and the polymer together. More specifically, this can be accomplished, for example, by the following method. A hydroxyl-containing monomer is polymerized singly or as admixed with other unsaturated monomer, in the presence of a hydroxyl-containing dispersion stabilizer resin and the organic liquid to obtain a nonaqueous dispersion containing the hydroxyl-containing resin and the resulting polymer with hydroxyl incorporated therein, and a polyisocyanate compound or the like is thereafter reacted with the dispersion at room temperature for several days or at about 60° to about 100° C. for about 1 to about 5 hours. The polyisocyanate compound to be used can be any of those having at least two isocyanate groups in the molecule. Examples of such compounds are aromatic diisocyanates such as tolylene diisocyanate, xylylene diisocyanate and 4,4'-diphenylmethane diisocyanate, or hydrides therof; aliphatic diisocyanates such as hexamethylene diisocyanate, lysine diisocyanate and dimer acid (dimerized tall fatty acid) diisocyanate; alicyclic diisocyanates such as isophorone diisocyanate; etc. Also usable for the same purpose are the combination of a dispersion stabilizer resin and a particulate polymer, each containing an acid group, and a polyepoxide, the combination of a dispersion stabilizer resin and a particulate polymer, each containing an epoxy group, and a polycarboxylic acid, the combination of dispersion stabilizer resin and a particulate polymer, each containing an epoxy group or isocyanate group, and a polysulfide compound, etc. Examples of useful polyepoxides are epoxy resin of the bisphenol A type, epoxy resin of the bisphenol F type, novolak epoxy resin, epoxy-containing acrylic resin and the like. Examples of useful polycarboxylic acids are adipic acid, sebacic acid, azelaic acid, isophthalic acid and the like. Examples of useful polysulfides are pentamethylene disulfide, hexamethylene disulfide, poly(ethylene disulfide) and the like.

Thus, the dispersion stabilizer resin can be chemically bonded to the particulate polymer. Satisfactory results can be achieved when the functional group or polymerizable double bond to be introduced into the resin and/or the polymer is in an amount of at least 0.1 in number on the average per molecule of the resin and/or the polymer.

As already stated, the amount of hydroxyl-containing unsaturated monomer to be present in the dispersion stabilizer resin for use in preparing the present composition (B) is about 1 to about 99 wt. % based on the monomers used, while when the hydroxyl group is reacted with the particulate polymer, the amount is so adjusted that the resin contains 1 to 99 wt. % of the hydroxyl-containing unsaturated monomer after the reaction.

Since the stabilizer resin and the particulate polymer are chemically bonded together in the nonaqueous dispersion thus prepared, the composition comprising the dispersion is excellent in storage stability and affords coatings which are outstanding in chemical and mechanical properties.

The curable composition (A) of the present invention comprises the nonaqueous dispersion and a curing catalyst which is admixed therewith and which is an acidic compound, basic compound or tin-containing compound as used singly or a mixture of a tin-containing compound and an acidic compound or basic compound. The curing catalyst gives the composition excellent curability at low temperatures. More specifically, the alkoxyl groups derived from the monomer of the formula (I) in the dispersion stabilizer resin are hydrolyzed by the curing catalyst in the presence of water to produce silanol groups, which subsequently undergo dehydration condensation for bonding, whereby the composition is crosslinked and cured at a low temperature.

Examples of curing catalysts for use in the invention are acidic compounds including p-toluenesulfonic acid, trichloroacetic acid, phosphoric acid, mono-n-propylphosphoric acid, monoisopropylphosphoric acid, mono-n-butylphosphoric acid, monoisobutylphosphoric acid, mono-tert-butylphosphoric acid, monooctylphosphoric acid, monodecylphosphoric acid and like monoalkylphosphoric acids, di-n-propylphosphoric acid, diisopropylphosphoric acid, di-n-butylphosphoric acid, diisobutylphosphoric acid, di-tert-butylphosphoric acid, dioctylphosphoric acid, didecylphosphoric acid and like dialkylphosphoric acid, phosphoric acid ester of β-hydroxyethyl (meth)acrylate, mono-n-propylphosphorous acid, monoisopropylphosphorous acid, mono-n-butylphosphorous acid, monoisobutylphosphorous acid, mono-tert-butylphosphorous acid, monooctylphosphorous acid, monodecylphosphorous acid and like monoalkylphosphorous acids, di-n-propylphosphorous acid, diisopropylphosphorous acid, di-n-butylphosphorous acid, diisobutylphosphorous acid, di-tert-butylphosphorous acid, dioctylphosphorous acid, didecylphosphorous acid and like dialkylphosphorous acids; tetraisopropyl titanate, tetrabutyl titanate, tin octilate, dibutyltin diacetate, dibutyltin dioctoate, dibutyltin dilaurate, dibutyltin dimaleate and like tin-containing compounds; butylamine, tert-butylamine, dibutylamine, hexylamine, ethylenediamine, triethylamine, isophoronediamine, imidazole, lithium hydroxide, sodium hydroxide, potassium hydroxide, sodium methylate and like basic compounds. At least one of these compounds is used. Of these, the phosphoric acid compounds and tin-containing compounds are desirable to use. However, it is not desirable to use the acidic compound conjointly with the basic compound.

According to the invention, it is suitable to use about 0.01 to about 10 parts by weight of the curing catalyst per 100 parts by weight of the nonaqueous dispersion, calculated as solids. If the proportion of the catalyst is smaller than this range, there is a tendency for the coating to exhibit lower curability, whereas proportions greater than this range tend to permit the composition to form brittle coatings and exhibit lower storage stability, hence undesirable. Preferably, the proportion is about 0.1 to about 2 parts by weight.

The curable composition (B) of the present invention comprises the nonaqueous dispersion obtained with use of the specified copolymer as the dispersion stabilizer resin, and a chelate compound admixed therewith and serving as a crosslinking curing agent. The chelate compound gives the composition very excellent curability at low temperatures. Stated more specifically, the alkoxyl groups derived from the monomer of the formula (I) in the stabilizer resin are hydrolyzed in the presence of water and the chelate compound as a catalyst to produce silanol groups, which subsequently undergo dehydration condensation or are bonded to one another with the chelate compound, whereby the composition is crosslinked and cured at a low temperature.

The chelate compounds for use in the invention are preferably aluminum chelate compounds, titanium chelate compounds and zirconium chelate compounds. Of these chelate compounds, more preferable are those containing a compound capable of forming a keto-enol tautomer, as ligands forming a stable chelate ring.

Examples of useful compounds capable of forming a keto-enol tautomer are β-diketones (such as acetylacetone), acetoacetic acid esters (such as methyl acetoacetate), malonic esters (such as ethyl malonate), ketones having hydroxyl in the β-position (such as diacetone alcohol), aldehydes having hydroxyl in the β-position (such as salicylaldehyde), esters having hydroxyl in the β-position (such as methyl salicylate), etc. Especially preferred results can be achieved when acetoacetates and β-diketones are used.

The aluminum chelate compound can be prepared advantageously, for example, by admixing the compound capable of forming a keto-enol tautomer with an aluminum alcoholate represented by the formula

wherein $R_6$ is alkyl having 1 to 20 carbon atoms or alkenyl, usually in the ratio of up to about 3 moles of the former per mole of the latter, and heating the mixture when required.

Examples of alkyl groups having 1 to 20 carbon atoms are the aforementioned alkyl groups having 1 to 10 carbon atoms, undecyl, dodecyl, tridecyl, tetradecyl, octadecyl and the like. Examples of alkenyl groups are vinyl, allyl and the like.

Examples of aluminum alcoholates represented by the formula (II) are aluminum trimethoxide, aluminum triethoxide, aluminum tri-n-propoxide, aluminum triisopropoxide, aluminum tri-n-butoxide, aluminum triisobutoxide, aluminum tri-sec-butoxide, aluminum tri-tert-butoxide, etc. It is especially desirable to use aluminum triisopropoxide, aluminum tri-sec-butoxide and aluminum tri-n-butoxide.

The titanium chelate compound can be prepared advantageously, for example, by admixing the compound capable of forming a keto-enol tautomer with a titanate represented by the formula

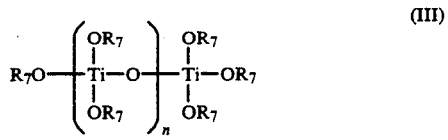

wherein n is an integer of 0 to 10, and $R_7$ is alkyl having 1 to 20 carbon atoms or alkenyl, usually in the ratio of up to about 4 moles of the former per mole of the Ti in the titanate, followed by heating when required. Examples of alkyl groups having 1 to 20 carbon atoms and alkenyl groups are the same as those given above.

Examples of titanates represented by the formula (III) wherein n is 0 are tetramethyl titanate, tetraethyl titanate, tetra-n-propyl titanate, tetraisopropyl titanate, tetra-n-butyl titanate, tetraisobutyl titanate, tetra-tert-butyl titanate, tetra-n-pentyl titanate, tetra-n-hexyl titanate, tetraisooctyl titanate, tetra-n-lauryl titanate and the like. Favorable results can be obtained by using tetraisopropyl titanate, tetra-n-butyl titanate, tetraisobutyl titanate and tetra-tert-butyl titanate. Of the titanates wherein n is 1 or greater, the dimers to hendecamers (n = 1 to 10 in the formula (III)) of tetraisopropyl titanate, tetra-n-butyl titanate, tetraisobutyl titanate and tetra-tert-butyl titanate achieve good results.

The zirconium chelate compound can be prepared favorably, for example, by admixing the compound capable of forming a keto-enol tautomer with a zirconate represented by the formula

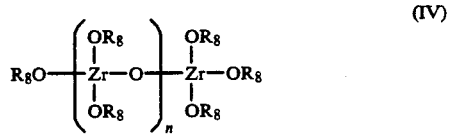

wherein n is an integer of 0 to 10, and $R_8$ is alkyl having 1 to 20 carbon atoms or alkenyl, usually in the ratio of up to about 4 moles of the former per mole of the Zr in the zirconate, followed by heating when required. Examples of alkyl groups with 1 to 20 carbon atoms and alkenyl groups are the same as those exemplified above.

Examples of zirconates represented by the formula (IV) wherein n is 0 are tetraethyl zirconate, tetra-n-propyl zirconate, tetraisopropyl zirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate and the like. Especially good result can be obtained with use of tetraisopropyl zirconate, tetra-n-propyl zirconate, tetraisobutyl zirconate, tetra-n-butyl zirconate, tetra-sec-butyl zirconate and tetra-tert-butyl zirconate. Of the zirconates wherein n is 1 or greater, the dimers to hendecamers (n = 1 to 10 in the formula (IV)) of tetraisopropyl zirconate, tetra-n-propyl zirconate, tetra-n-butyl zirconate, tetraisobutyl zirconate, tetra-sec-butyl zirconate and tetra-tert-butyl zirconate give good results. The chelate compound may contain structural units wherein such zirconates are associated with each other.

Examples of especially preferred chelate compounds for use in the invention are aluminum chelate compounds such as diisopropylate ethylacetoacetate aluminum, tris(ethylacetoacetate)aluminum, tris(n-propylacetoacetate)aluminum, tris(isopropylacetoacetate)-aluminum, tris(n-butylacetoacetate)aluminum, isopropoxy bisethylacetoacetate aluminum, diisopropoxy ethylacetoacetate aluminum, tris(acetylacetonato)aluminum, tris(ethylacetonato)aluminum, diisopropylateethylacetonatoaluminum, monoacetylacetonato-bis(ethylacetonato)aluminum, monoethylacetoacetate bis(acetylacetonato)aluminum, tris(isopropylate)aluminum, tris(sec-butylate)aluminum, diisopropylate mono-sec-butoxy aluminum and tri(acetylacetone)aluminum; titanium chelate compounds such as diisopropoxybis(ethylacetoacetate)titanate, diisopropoxy-bis(acetylacetate)titanate and diisopropoxy-bis(acetylacetone)titanate; and zirconium chelate compounds such as tetrakis(acetylacetone)zirconium, tetrakis(n-propylacetoacetate)zirconium, tetrakis(acetylacetonato)zirconium and tetrakis(ethylacetoacetate)zirconium.

With the present invention, one of the above chelate compounds is used, or a suitable combination of at least two of them may be used as the crosslinking curing agent. Such a chelate compound is uniformly miscible with the nonaqueous dispersion in widely varying proportions. It is suitable to use about 0.1 to about 100 parts by weight of the chelate compound per 100 parts by weight of the nonaqueous dispersion calculated as solids. When the proportion is less than this range, there is a tendency toward lower crosslinking curability, while proportions exceeding the range tend to make the resulting coating brittle. Preferably, the proportion is about 0.1 to about 20 parts by weight.

When required, extender pigments, coloring pigments, dyes, plasticizers, etc. can be added to the curable compositions of the invention. Examples of useful plasticizers are those already known, such as dimethyl phthalate, dioctyl phthalate and like low-molecular-weight plasticizers, vinyl polymer plasticizers, polyester plasticizers and like high-molecular-weight plasticizers. These plasticizers can be admixed with the nonaqueous dispersion before the preparation of the composition or can be dissolved in the radical-polymerizable unsaturated monomer for preparing the dispersion so as to be incorporated in the dispersed particulate polymer in the resulting dispersion. Further when required, amino resin, epoxy resin, polyisocyanate resin and the like which are generally used as curing agents may be used in combination with the present composition. Also usable are other acrylic resin, alkyd resin, polyester resin, epoxy resin and the like, as blended with the composition.

The curable compositions of the invention can be used favorably, for example, as coating compositions, adhesives, inks, etc. and also as impregnants, surface-treating agents and the like for fibers and papers.

The compositions of the invention are easily curable by crosslinking at low temperatures in the presence of water. For example, the composition (A) is curable at about 10° to about 100° C., and the composition (B) at about −20° to about 100° C. The present compositions of the invention can be fully cured usually in about 8 hours to about 7 days without necessitating any heating, merely by adding water to the composition and thereafter applying the composition, or by applying the composition and exposing the coating to air. The composition can be fully cured with a quantity of water which is as small as the amount of moisture in air. When water is added to the composition before application, about 0.1 to about 1 wt. % of water usually produces a satisfactory result.

The curable compositions of the invention has the advantages of being excellent in curability at low temperatures and storage stability and giving coatings having a satisfactory surface, highly resistant to chemicals, water and weather and outstanding in mechanical characteristics such as resistance to impact and bending.

The curable composition of the invention comprises a nonaqueous dispersion which is composed of a liquid phase in the form of a solution of dispersion stabilizer resin in an organic liquid, and a solid phase of polymer particles obtained by the polymerization of a radical-polymerizable unsaturated monomer and stably dispersed in the liquid phase; and a curing catalyst, or a chelate compound as a crosslinking curing agent incorporated in the dispersion. The coating formed from the composition has a continuous phase possessing siloxane bonds and stable to light and chemicals, contains the particulate polymer stabilized by the continuous phase and reinforcing the coating and is therefore excellent in mechanical characteristics, such as resistance to impact and bending, and also in weather resistance. The improved mechanical characteristics appear attributable to stress mitigating activities such as absorption of external energy due to great plastic deformation of polymer particles and absorption of impact energy due to crazing produced by the particles.

When the present composition is stored for a long period of time, the dispersion stabilizer resin portion present on the surfaces of some polymer particles and the dispersion stabilizer resin portion present on other polymer particles repel each other and are less likely to permit reaction between the particles, consequently eliminating the likelihood of gelation almost completely. As already stated, the present composition is easily curable by crosslinking at a low temperature of up to 100° C. in the presence of a very small amount of water, such as the moisture in air. The presence of the particular polymer serves to diminish the likelihood that the curing reaction will produce alcohol and like products, thereby reducing the likelihood of shrinkage or the like and permitting the resulting coating to have an excellent surface and high mechanical characteristics.

The present invention will be described in greater detail with reference to the following examples and comparative examples, in which all the parts and percentages are by weight unless otherwise specified.

Examples 1 to 8 and Comparative Examples 1 to 4 are concerned with the composition (A), and Examples 9 to 14 and Comparative Examples 5 to 7 with the composition (B).

EXAMPLE 1

Preparation of Dispersion Stabilizer Resin (a)

Xylene (100 parts) was heated to 120° C., and the monomers and polymerization initiator given below were added dropwise to the xylene over a period of 3 hours. The mixture was thereafter aged for 2 hours.

| γ-Methacryloxypropyltrimethoxysilane | 5 parts |
| --- | --- |
| Styrene | 10 parts |
| n-Butyl methacrylate | 35 parts |
| 2-Ethylhexyl methacrylate | 25 parts |
| Lauryl methacrylate | 25 parts |
| 2,2'-Azobisisobutyronitrile | 4 parts |

The reaction gave an acrylic resin varnish, which was 50% in nonvolatile content, B in viscosity (Gardner, 25° C., the same as hereinafter) and about 10000 in weight average molecular weight.

Preparation of Nonaqueous Dispersion of Particulate Polymer

| Heptane | 100 parts |
| --- | --- |
| Varnish of dispersion stabilizer resin (a) | 83 parts |

These ingredients were placed into a flask and refluxed with heating. The monomers and polymerization initiator given below were added dropwise to the mixture over a period of 3 hours, followed by aging for 2 hours.

| γ-Methacryloxypropyltrimethoxysilane | 20 parts |
| --- | --- |
| Styrene | 15 parts |
| Acrylonitrile | 15 parts |
| Methyl methacrylate | 50 parts |
| 2,2'-Azobisisobutyronitrile | 2 parts |

The resulting mixture was a milk white stable low-viscosity polymer dispersion having a nonvolatile content of 50% and a viscosity of Al and containing polymer particles 0.30 to 0.35 μm in size (as measured by "Coulter N-4," trade name, product of Coulter Co., the same as hereinafter). The dispersion was allowed to stand at room temperature for 3 months, but no sediment or coarse particles occurred.

Monobutylphosphoric acid was uniformedly admixed with the nonaqueous dispersion in the ratio of 0.5 part of the acid per 100 parts of the solids of the dispersion to obtain a curable composition of the invention.

EXAMPLE 2

Preparation of Dispersion Stabilizer Resin (b)

Xylene (100 parts) was heated to 120° C., and the monomers and polymerization initiator given below were added dropwise to the xylene over a period of 3 hours. The mixture was thereafter aged for 2 hours.

| | |
|---|---|
| γ-Methacryloxypropyltrimethoxysilane | 30 parts |
| Styrene | 15 parts |
| n-Butyl methacrylate | 20 parts |
| 2-Ethylhexyl methacrylate | 15 parts |
| Lauryl methacrylate | 20 parts |
| 2,2'-Azobisisobutyronitrile | 4 parts |

The reaction gave an acrylic resin varnish, which was 50% in nonvolatile content, D in viscosity and about 10000 in weight average molecular weight. Preparation of nonaqueous dispersion of particulate polymer

| | |
|---|---|
| Heptane | 100 parts |
| Varnish of dispersion stabilizer resin (b) | 83 parts |

These ingredients were placed into a flask and refluxed with heating. The monomers and polymerization initiator given below were added dropwise to the mixture over a period of 3 hours, followed by aging for 2 hours.

| | |
|---|---|
| Styrene | 15 parts |
| Acrylonitrile | 15 parts |
| Methyl methacrylate | 70 parts |
| 2,2'-Azobisisobutyronitrile | 1 part |

The resulting mixture was a milk white stable low-viscosity polymer dispersion having a nonvolatile content of 50% and a viscosity of A and containing polymer particles 0.30 to 0.40 μm in size. The dispersion was allowed to stand at room temperature for 3 months, but no sediment or coarse particles occurred.

Monobutylphosphoric acid (0.5 part) was uniformedly admixed with 100 parts, calculated as solids, of the nonaqueous dispersion to obtain a composition of the invention.

EXAMPLE 3

Preparation of Dispersion Stabilizer Resin (c)

Toluene (80 parts) was maintained at 110° C., the monomers and polymerization initiator given below were added dropwise to the toluene over a period of 3 hours, the mixture was thereafter aged for 2 hours.

| | |
|---|---|
| γ-Methacryloxypropyltrimethoxysilane | 25 parts |
| 2-Ethylhexyl methacrylate | 20 parts |
| Lauryl methacrylate | 30 parts |
| n-Butyl acrylate | 25 parts |
| 2,2'-Azobisisobutyronitrile | 2 parts |

The reaction gave an acrylic resin varnish, which was 55% in nonvolatile content, E in viscosity and about 16000 in weight average molecular weight. Preparation of nonaqueous dispersion of particulate polymer

| | |
|---|---|
| Cyclohexane | 20 parts |
| Mineral spirit | 62 parts |
| Varnish of dispersion stabilizer resin (c) | 121 parts |

These ingredients were placed into a flask and maintained at 95° C. with heating. The monomers and polymerization initiator given below were added dropwise to the mixture over a period of 3 hours, followed by aging for 2 hours.

| | |
|---|---|
| Styrene | 15 parts |
| Methyl methacrylate | 42 parts |
| Acrylonitrile | 20 parts |
| Glycidyl methacrylate | 5 parts |
| Acrylic acid | 3 parts |
| 2-Hydroxyethyl acrylate | 15 parts |
| 2,2'-Azobisisobutyronitrile | 2 parts |

The resulting mixture was a milk white stable low-viscosity polymer dispersion having a nonvolatile convent of 55% and a viscosity of D and containing polymer particles 0.50 to 0.55 μm in size. The interior of the particles was found to have been crosslinked owing to the reaction between the epoxy group of the glycidyl methacrylate and the carboxyl group of the acrylic acid. The dispersion was allowed to stand at room temperature for 3 months, but no sediment or coarse particles occurred.

Monobutylphosphoric acid (0.5 part) was uniformly admixed with 100 parts, calculated as solids, of the nonaqueous dispersion to obtain a composition of the invention.

EXAMPLE 4

Preparation of Dispersion Stabilizer Resin (d)

Isobutyl acetate (50 parts) and 30 parts of toluene were refluxed with heating, the monomers and polymerization initiator given below were added dropwise to the mixture over a period of 3 hours, and the resulting mixture was thereafter aged for 3 hours.

| | |
|---|---|
| γ-Methacryloxypropylmethyl-dimethoxysilane | 22 parts |
| Styrene | 20 parts |
| 2-Ethylhexyl methacrylate | 38 parts |
| 2-Hydroxyethyl methacrylate | 9 parts |
| Glycidyl methacrylate | 1 part |
| tert-Butylperoxy 2-ethylhexanoate | 3 parts |

The reaction gave an acrylic resin varnish, which was 55% in nonvolatile content, H in viscosity and about 16000 in weight average molecular weight.

Subsequently, the following compounds were added to the whole amount of the varnish.

| | |
|---|---|
| Methacrylic acid | 0.8 part |
| 4-tert-Butylpyrocatechol | 0.02 part |
| Dimethylamino ethanol | 0.1 part |

The mixture was refluxed for 5 hours to introduce copolymerizable double bonds into the molecular chains of the dispersion stabilizer resin. About 0.6 double bond was found to have been introduced per molecular chain by the measurement of the resin acid value.

Preparation of Nonaqueous Dispersion of Particulate Polymer

| Heptane | 93 parts |
|---|---|
| Varnish of dispersion stabilizer resin (d) | 98 parts |

These ingredients were placed into a flask and refluxed with heating, the monomers and polymerization initiator given below were added dropwise to the mixture over a period of 3 hours, and the resulting mixture was aged for 2 hours.

| Styrene | 15 parts |
|---|---|
| Methyl methacrylate | 50 parts |
| Acrylonitrile | 25 parts |
| 2-Perfluorooctylethyl methacrylate | 10 parts |
| tert-Butylperoxy 2-ethylhexanoate | 1.5 parts |

The resulting mixture was a milk white stable low-viscosity polymer dispersion having a nonvolatile content of 55% and a viscosity of J and containing polymer particles 0.2 to 0.3 μm in size. When the dispersion was allowed to stand at room temperature for 3 months, no sediment or coarse particles occurred.

Monobutylphosphoric acid (0.5 part) was uniformly admixed with 100 parts, calculated as solids, of the nonaqueous dispersion obtain a curable composition of the invention.

EXAMPLE 5

Preparation of Dispersion Stabilizer Resin (e)

Xylene (100 parts) was heated to 120° C., and the monomers and polymerization initiator given below were added dropwise to the xylene over a period of 3 hours. The mixture was thereafter aged for 2 hours.

| γ-Methacryloxypropylmethyldimethoxysilane | 30 parts |
|---|---|
| Styrene | 15 parts |
| n-Butyl methacrylate | 20 parts |
| 2-Ethylhexyl methacrylate | 15 parts |
| Lauryl methacrylate | 20 parts |
| 2,2'-Azobisisobutyronitrile | 4 parts |

The reaction gave an acrylic resin varnish, which was 50% in nonvolatile content, C in viscosity and about 10000 in weight average molecular weight. Preparation of nonaqueous dispersion of particulate polymer

| Heptane | 100 parts |
|---|---|
| Varnish of dispersion stabilizer resin (e) | 83 parts |

These ingredients were placed into a flask and refluxed with heating. The monomers and polymerization initiator given below were added dropwise to the mixture over a period of 3 hours, followed by aging for 2 hours.

| Styrene | 15 parts |
|---|---|
| Acrylonitrile | 15 parts |
| Methyl methacrylate | 70 parts |
| 2,2'-Azobisisobutyronitrile | 1 part |

The resulting mixture was a milk white stable low-viscosity polymer dispersion having a nonvolatile content of 50% and a viscosity of B and containing polymer particles 0.35 to 0.40 μm in size. When the dispersion was allowed to stand at room temperature for 3 months, no sediment or coarse particles occurred.

Monobutylphosphoric acid (0.5 part) was uniformly admixed with 100 parts, calculated as solids, of the nonaqueous dispersion to obtain a composition of the invention.

EXAMPLE 6

Monobutylphosphoric acid (0.1 part) was uniformly admixed with 100 parts, calculated as solids, of the nonaqueous dispersion obtained in Example 1 to prepare a composition of the invention.

EXAMPLE 7

Dibutyltin diacetate (1 part) was uniformly admixed with 100 parts, calculated as solids, of the nonaqueous dispersion obtained in Example 1 to prepare a composition of the invention.

EXAMPLE 8

Preparation of Dispersion Stabilizer Resin (f)

Xylene (100 parts) was heated to 120° C., and the monomers and polymerization initiator given below were added dropwise to the xylene over a period of 3 hours. The mixture was thereafter aged for 2 hours.

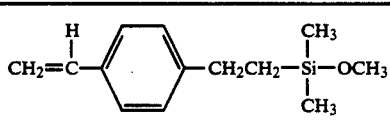

| | 25 parts |
|---|---|
| Styrene | 25 parts |
| n-Butyl methacrylate | 10 parts |
| 2-Ethylhexyl methacrylate | 15 parts |
| Lauryl methacrylate | 25 parts |
| 2,2'-Azobisisobutyronitrile | 4 parts |

The reaction gave an acrylic resin varnish, which was 50% in nonvolatile content, E in viscosity and about 10000 in weight average molecular weight. Preparation of nonaqueous dispersion of particulate polymer

| Heptane | 100 parts |
|---|---|
| Varnish of dispersion stabilizer resin (f) | 83 parts |

These ingredients were placed into a flask and refluxed with heating. The monomers and polymerization initiator given below were added dropwise to the mixture over a period of 3 hours, followed by aging for 2 hours.

| Styrene | 15 parts |
|---|---|
| Acrylonitrile | 15 parts |
| Methyl methacrylate | 70 parts |
| 2,2'-Azobisisobutyronitrile | 1 part |

The resulting mixture was a milk white stable low-viscosity polymer dispersion having a nonvolatile content of 50% and a viscosity of A and containing polymer particles 0.35 to 0.45 μm in size. The dispersion was allowed to stand at room temperature for 3 months, but no sediment or coarse particles occurred.

Dibutylphosphorous acid (1.0 part) was uniformly admixed with 100 parts, calculated as solids, of the nonaqueous dispersion to obtain a composition of the invention.

COMPARATIVE EXAMPLE 1

Xylene (100 parts) was heated to 120° C., and the monomers and polymerization initiator given below were added dropwise to the xylene over a period of 3 hours, and the mixture was thereafter aged for 2 hours.

| | |
|---|---|
| γ-Methacryloxypropyltrimethoxysilane | 12.5 parts |
| Styrene | 12.5 parts |
| Acrylonitrile | 7.5 parts |
| n-Butyl methacrylate | 17.5 parts |
| 2-Ethylhexyl methacrylate | 12.5 parts |
| Lauryl methacrylate | 12.5 parts |
| Methyl methacrylate | 25 parts |
| 2,2'-Azobisisobutyronitrile | 3 parts |

The reaction gave an acrylic resin varnish, which was 50% in nonvolatile content, G in viscosity and about 14000 in weight average molecular weight.

Monobutylphosphoric acid (0.5 part) was uniformly admixed with 100 parts, calculated as solids, of the varnish to obtain a comparative composition.

COMPARATIVE EXAMPLE 2

Xylene (100 parts) was heated to 120° C., and the monomers and polymerization initiator given below were added dropwise to the xylene over a period of 3 hours, and the mixture was thereafter aged for 2 hours.

| | |
|---|---|
| γ-Methacryloxypropyltrimethoxysilane | 30 parts |
| Styrene | 10.0 parts |
| Acrylonitrile | 7.5 parts |
| n-Butyl methacrylate | 12.5 parts |
| 2-Ethylhexyl methacrylate | 10 parts |
| Lauryl methacrylate | 10 parts |
| Methyl methacrylate | 20 parts |
| 2,2'-Azobisisobutyronitrile | 3 parts |

The reaction gave an acrylic resin varnish, which was 50% in nonvolatile content, F in viscosity and about 14000 in weight average molecular weight.

Monobutylphosphoric acid (0.5 part) was uniformly admixed with 100 parts, calculated as solids, of the varnish to obtain a comparative composition.

EXAMPLE 3

Xylene (100 parts) was heated to 120° C., and the monomers and polymerization initiator given below were added dropwise to the xylene over a period of 3 hours, and the mixture was thereafter aged for 2 hours.

| | |
|---|---|
| γ-Methacryloxypropyltrimethoxysilane | 5 parts |
| Styrene | 15 parts |
| Acrylonitrile | 7.5 parts |
| n-Butyl methacrylate | 20 parts |
| 2-Ethylhexyl methacrylate | 12.5 parts |
| Lauryl methacrylate | 10 parts |
| Methyl methacrylate | 30 parts |
| 2,2'-Azobisisobutyronitrile | 3 parts |

The reaction gave an acrylic resin varnish, which was 50% in nonvolatile content, H in viscosity and about 14000 in weight average molecular weight.

Monobutylphosphoric acid (0.5 part) was uniformly admixed with 100 parts, calculated as solids, of the varnish to obtain a comparative composition.

COMPARATIVE EXAMPLE 4

An acrylic resin varnish was prepared in the same manner as in Example 1 except that the γ-methacryloxypropyltrimethoxysilane was replaced by the same amount of n-butyl methacrylate. The varnish obtained was 50% in nonvolatile content, A in viscosity and about 10000 in weight average molecular weight.

A nonaqueous dispersion, 50% in nonvolatile content, B in viscosity and 0.20 to 0.30 μm in polymer particle size, was prepared in the same manner as in Example 1 except that the varnish of dispersion stabilizer resin (a) was replaced by this varnish.

Monobutylphosphoric acid (0.5 part) was uniformly admixed with 100 parts, calculated as solids, of the nonaqueous dispersion to obtain a comparative composition.

The compositions prepared in Examples 1 to 8 and Comparative Examples 1 to 4 were tested for properties by the following methods.

* Storage stability: The composition was stored in a closed container as placed in a constant-temperature chamber at 30° C., and the time (days) taken for the composition to become so viscous as to resemble pudding was determined.
* Properties of coating: Polished soft steel panels were coated with the composition to a dry thickness of 50 μm. The coating was baked at a temperature of 80° C. for 30 minutes and thereafter tested for the following properties.
* Gel fraction ratio: The coating as separated off was placed into a mixture of acetone and methanol in equal amounts by weight and maintained at the reflux temperature, subjected to extraction for 4 hours and thereafter checked for the ratio of insoluble coating residue (%).
* State of coating surface: Observed with the unaided eye and evaluated according to JIS K 5400.
* Water resistance: The coated panel was immersed in tap water at 40° C. for 168 hours and thereafter checked for the state of the coating surface.
* Alkali resistance: The coated panel was immersed in 10% aqueous solution of NaOH at 25° C. for 24 hours and thereafter checked for the state of the coating surface.
* Acid resistance: The coated panel was immersed in 5% aqueous solution of HCl at 25° C. for 24 hours and thereafter checked for the state of the coating surface.
* Weather resistance: The state of coating surface was checked with the lapse of time using a Sunshine WeatherOmeter to determine the elapsed time (hours) before faults such as dulling and blistering occurred.
* Impact resistance: A 500-gram weight was dropped onto the coating using a Du Pont impact tester to determine a maximum distance of fall (cm) at which the coating remained free of any fault such as cracking or scaling.
* Bending resistance: The coated panel was tested according to JIS K 5400 using a bending resistance tester (with a rod, 10 cm in diameter).

Table 1 shows the results.

TABLE 1

| Item | Example 1 | 2 | 3 | 4 | 5 | 6 | 7 | 8 | Comparative Example 1 | 2 | 3 | 4 |
|---|---|---|---|---|---|---|---|---|---|---|---|---|
| Storage stability (days) | 90< | 90< | 90< | 90< | 90< | 90< | 90< | 90< | 7 | 2 | 90< | 90< |
| State of coating surface | Good | Good | Good | Good | Good | Good | Good | Good | Shrink | Shrink | Good | Good |
| Gel fraction ratio (%) | 97 | 96 | 97 | 95 | 92 | 90 | 96 | 91 | 90 | 97 | 81 | 20 |
| Water resistance | No fault | No fault | No fault | No fault | No fault | No fault | No fault | No fault | No fault | No fault | Blister | Not measurable |
| Alkali resistance | No fault | No fault | No fault | No fault | No fault | No fault | No fault | No fault | No fault | No fault | No fault | Not measurable |
| Acid resistance | No fault | No fault | No fault | No fault | No fault | No fault | No fault | No fault | No fault | No fault | No fault | Not measurable |
| Impact resistance (cm) | 50< | 50< | 50< | 50< | 50< | 50< | 50< | 50< | 50< | 30 | 40 | Not measurable |
| Weather resistance (hrs) | 3000< | 3000< | 3000< | 3000< | 3000< | 3000< | 3000< | 3000< | 1000 | 1500 | 500 | Not measurable |
| Bending resistance | No fault | No fault | No fault | No fault | No fault | No fault | No fault | No fault | Crack | Crack | Crack | Not measurable |

EXAMPLE 9

Preparation of Dispersion Stabilizer Resin (g)

| | |
|---|---|
| Isobutyl acetate | 40 parts |
| Toluene | 40 parts |

These materials were refluxed with heating, the monomers and polymerization initiator given below were added dropwise to the mixture over a period of 3 hours, and the mixture was thereafter aged for 2 hours.

| | |
|---|---|
| γ-Methacryloxypropyltrimethoxysilane | 5 parts |
| Styrene | 10 parts |
| Isobutyl methacrylate | 49 parts |
| 2-Ethylhexyl methacrylate | 25 parts |
| 2-Hydroxyethyl methacrylate | 11 parts |
| 2,2'-Azobisisobutyronitrile | 2 parts |

The reaction gave an acrylic resin varnish, which was 55% in nonvolatile content, G in viscosity and 16000 in weight average molecular weight.

Preparation of Nonaqueous Dispersion

| | |
|---|---|
| Heptane | 93 parts |
| Varnish of dispersion stabilizer resin (g) | 98 parts |

These materials were placed into a flask and refluxed with heating, the monomers and polymerization initiator given below were added dropwise to the mixture over a period of 3 hours, and the mixture was thereafter aged for 2 hours.

| | |
|---|---|
| Styrene | 15 parts |
| Methyl methacrylate | 40 parts |
| Acrylonitrile | 30 parts |
| 2-Hydroxyethyl methacrylate | 15 parts |
| tert-Butylperoxy-2-ethyl hexanoate | 1.5 parts |

The reaction gave a nonaqueous dispersion, which was a milk white stable low-viscosity polymer dispersion having a nonvolatile content of 53% and a viscosity of B and containing polymer particles 0.2 to 0.3 μm in size (as measured under electron microscope, the same as hereinafter). When the dispersion was allowed to stand at room temperature for 3 months, no sediment or coarse particles occurred.

Monoethylacetoacetate bis-(acetylacetonato)aluminum (1 part) was uniformly admixed with 100 parts, calculated as solids, of the nonaqueous dispersion to obtain a curable composition of the invention.

EXAMPLE 10

Preparation of Dispersion Stabilizer Resin (h)

| | |
|---|---|
| Isobutyl acetate | 40 parts |
| Toluene | 40 parts |

These materials were refluxed with heating, the monomers and polymerization initiator given below were added dropwise to the mixture over a period of 3 hours, and the mixture was thereafter aged for 2 hours.

| | |
|---|---|
| γ-Methacryloxypropylmethyldimethoxysilane | 30 parts |
| Styrene | 15 parts |
| Isobutyl methacrylate | 37 parts |
| Lauryl methacrylate | 15 parts |
| 2-Hydroxyethyl methacrylate | 3 parts |
| 2,2'-Azobisisobutyronitrile | 1.8 parts |

The reaction gave an acrylic resin varnish, which was 55% in nonvolatile content, M in viscosity and 18000 in weight average molecular weight.

Preparation of Nonaqueous Dispersion

| | |
|---|---|
| Heptane | 82 parts |
| Varnish of dispersion stabilizer resin (h) | 121 parts |

These materials were placed into a flask and refluxed with heating, the monomers and polymerization initiator given below were added dropwise to the mixture over a period of 3 hours, and the mixture was thereafter aged for 2 hours.

| γ-Methacryloxypropyltrimethoxysilane | 7 parts |
| --- | --- |
| Styrene | 8 parts |
| Methyl methacrylate | 30 parts |
| Acrylonitrile | 40 parts |
| 2-Hydroxyethyl methacrylate | 15 parts |
| 2,2'-Azobisisobutyronitrile | 2 parts |

The reaction gave a nonaqueous dispersion, which was a milk white stable low-viscosity polymer dispersion having a nonvolatile content of 55% and a viscosity of E and containing polymer particles 0.45 to 0.50 μm in size. When the dispersion was allowed to stand at room temperature for 3 months, no sediment or coarse particles occurred.

Diisopropoxy-bis(acetylacetonato)titanate (10 parts) was uniformly admixed with 100 parts, calculated as solids, of the nonaqueous dispersion to obtain a curable composition of the invention.

EXAMPLE 11

Preparation of Dispersion Stabilizer Resin (i)

Toluene (80 parts) was maintained at 110° C. with heating, the monomers and polymerization initiator given below were added dropwise to the toluene over a period of 3 hours, and the mixture was thereafter aged for 2 hours.

| γ-Methacryloxypropyltriethoxysilane | 25 parts |
| --- | --- |
| "Placcel FM-3 Monomer" (hydroxyl-containing acrylic monomer modified with ε-caprolactone, product of Daicel Ltd.) | 20 parts |
| Lauryl methacrylate | 30 parts |
| n-Butyl acrylate | 25 parts |
| 2,2'-Azobisisobutyronitrile | 2 parts |

The reaction gave an acrylic resin varnish, which was 55% in nonvolatile content, C in viscosity and 16000 in weight average molecular weight.

Preparation of Nonaqueous Dispersion

| Cyclohexane | 20 parts |
| --- | --- |
| Mineral spirit | 62 parts |
| Varnish of dispersion stabilizer resin (i) | 121 parts |

These materials were placed into a flask and maintained at 95° C. with heating, the monomers and polymerization initiator given below were added dropwise to the mixture over a period of 3 hours, and the mixture was thereafter aged for 2 hours.

| Styrene | 15 parts |
| --- | --- |
| Methyl methacrylate | 42 parts |
| Acrylonitrile | 20 parts |
| Glycidyl methacrylate | 5 parts |
| Acrylic acid | 3 parts |
| 2-Hydroxyethyl methacrylate | 15 parts |
| 2,2'-Azobisisobutyronitrile | 2 parts |

The reaction gave a nonaqueous dispersion, which was a milk white stable low-viscosity polymer dispersion having a nonvolatile content of 55% and a viscosity of D and containing polymer particles 0.50 to 0.55 μm in size. The interior of the polymer particles was found to have been crosslinked owing to the reaction between the epoxy group of the glycidyl methacrylate and the carboxyl group of the acrylic acid. When the dispersion was allowed to stand at room temperature for 3 months, no sediment or coarse particles occurred.

Tetrakis(acetylacetonato)zirconium (20 parts) was uniformly admixed with 100 parts, calculated as solids, of the nonaqueous dispersion to obtain a curable composition of the invention.

EXAMPLE 12

Preparation of Dispersion Stabilizer Resin (j)

| Isobutyl acetate | 50 parts |
| --- | --- |
| Toluene | 30 parts |

These materials were refluxed with heating, the monomers and polymerization initiator given below were added dropwise to the mixture over a period of 3 hours, and the mixture was thereafter aged for 3 hours.

| γ-Methacryloxypropylmethyl-diethoxysilane | 22 parts |
| --- | --- |
| Styrene | 20 parts |
| Isobutyl methacrylate | 10 parts |
| 2-Ethylhexyl methacrylate | 38 parts |
| 2-Hydroxyethyl methacrylate | 9 parts |
| Glycidyl methacrylate | 1 part |
| tert-Butylperoxy-2-ethyl hexanoate | 3 parts |

The reaction gave an acrylic resin varnish, which was 55% in nonvolatile content, H in viscosity and 16000 in weight average molecular weight.

Subsequently, the following compounds were added to the whole amount of the varnish.

| Methacrylic acid | 0.8 part |
| --- | --- |
| 4-tert-butylpyrocatechol | 0.02 part |
| Dimethylamino ethanol | 0.1 part |

The mixture was subjected to a reflux reaction for 5 hours to introduce copolymerizable double bonds into the molecular chains of the dispersion stabilizer resin. About 0.6 double bond was found to have been introduced per molecular chain by the measurment of the resin acid value.

Preparation of Nonaqueous Dispersion

| Heptane | 93 parts |
| --- | --- |
| Varnish of dispersion stabilizer resin (j) | 98 parts |

These materials were placed into a flask and refluxed with heating, the monomers and polymerization initiator given below were added dropwise to the mixture over a period of 3 hours, and the mixture was thereafter aged for 2 hours.

| Styrene | 10 parts |
| --- | --- |
| Methyl methacrylate | 45 parts |
| Acrylonitrile | 25 parts |
| 2-Perfluorooctylethyl methacrylate | 5 parts |
| 2-Hydroxyethyl methacrylate | 15 parts |
| tert-Butylperoxy-2-ethyl hexanoate | 1.5 parts |

The reaction gave a nonaqueous dispersion, which was a milk white stable low-viscosity polymer dispersion having a nonvolatile content of 54% and a viscosity of H and containing polymer particles 0.2 to 0.3 μm in size. When the dispersion was allowed to stand at room temperature for 3 months, no sediment or coarse particles occurred. However, the viscosity increased to L.

Tris(acetylacetonato)aluminum (1.5 parts) was uniformly admixed with 100 parts, calculated as solids, of the nonaqueous dispersion to obtain a curable composition of the invention.

EXAMPLE 13

Preparation of Dispersion Stabilizer Resin (k)

A dispersion stabilizer resin (k) was prepared in the same manner as the dispersion stabilizer resin (g) of Example 9 except that the γ-methacryloxypropyltrimethoxysilane was replaced by the same amount of the compound of the formula

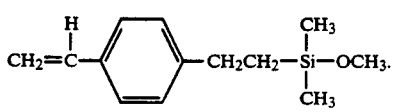

The acrylic resin varnish obtained was 55% in nonvolatile content, H in viscosity and 15000 in weight average molecular weight.

Preparation of Nonaqueous Dispersion

| Heptane | 93 parts |
| Varnish of dispersion stabilizer resin (k) | 98 parts |

These materials were placed into a flask and refluxed with heating, the monomers and polymerization initiator given below were added dropwise to the mixture over a period of 3 hours, and the mixture was thereafter aged for 2 hours.

| Styrene | 15 parts |
| Methyl methacrylate | 40 parts |
| Acrylonitrile | 30 parts |
| 2-Hydroxyethyl methacrylate | 15 parts |
| tert-Butylperoxy-2-ethyl hexanoate | 1.5 parts |

The reaction gave a nonaqueous dispersion, which was a milk white stable low-viscosity polymer dispersion having a nonvolatile content of 53% and a viscosity of C and containing polymer particles 0.3 to 0.4 μm in size. When the dispersion was allowed to stand at room temperature for 3 months, no sediment or coarse particles occurred.

Diisopropoxyethylacetoacetate aluminum (5 parts) was uniformly admixed with 100 parts, calculated as solids, of the nonaqueous dispersion to obtain a curable composition of the invention.

EXAMPLE 14

Preparation of Dispersion Stabilizer Resin (l)

| Isobutyl acetate | 40 parts |
| Toluene | 40 parts |

The above materials were refluxed with heating, the monomers and polymerization initiator were added dropwise to the mixture over a period of 3 hours, and the mixture was thereafter aged for 2 hours.

| γ-Methacryloxypropyltributoxysilane | 80 parts |
| 2-Hydroxyethyl methacrylate | 20 parts |
| 2,2'-Azobisisobutyronitrile | 2 parts |

The reaction gave an acrylic resin varnish, which was 55% in nonvolatile content, G in viscosity and 16000 in weight average molecular weight.

Preparation of Nonaqueous Dispersion

| Heptane | 93 parts |
| Varnish of dispersion stabilizer resin (l) | 98 parts |

These materials were placed into a flask and refluxed with heating, the monomers and polymerization initiator given below were added dropwise to the mixture over a period of 3 hours, and the mixture was thereafter aged for 2 hours.

| Styrene | 15 parts |
| Methyl methacrylate | 40 parts |
| Acrylonitrile | 30 parts |
| 2-Hydroxyethyl methacrylate | 15 parts |
| tert-Butylperoxy-2-ethyl hexanoate | 1.5 parts |

The reaction gave a nonaqueous dispersion, which was a milk white stable low-viscosity polymer dispersion having a nonvolatile content of 53% and a viscosity of C and containing polymer particles 0.3 to 0.4 μm in size. When the dispersion was allowed to stand at room temperature for 3 months, no sediment or coarse particles occurred.

Tris(ethylacetoacetate)aluminum (12 parts) was uniformly admixed with 100 parts, calculated as solids, of the nonaqueous dispersion to obtain a curable composition of the invention.

COMPARATIVE EXAMPLE 5

One part of monoethylacetoacetatebis(acetylacetonato)aluminum was uniformly admixed with 100 parts, calculated as solids, of the dispersion stabilizer resin (g) to obtain a comparative composition.

COMPARATIVE EXAMPLE 6

A comparative composition was prepared in the same manner as in Example 9 with the exception of not using the monoethylacetoacetatebis(acetylacetonato)aluminum used in Example 9.

COMPARATIVE EXAMPLE 7

A dispersion stabilizer resin, 55% in nonvolatile content, H in viscosity and 16000 in molecular weight, was prepared in the same manner as the dispersion stabilizer resin (g) of Example 9 except that the γ-methacryloxypropyltrimethoxysilane was replaced by the same amount of isobutyl methacrylate. A nonaqueous dispersion, 53% in nonvolatile content, C in viscosity and 0.2 to 0.3 μm in particle size, was prepared in the same manner as in Example 9 except that this resin was used in place of the dispersion stabilizer resin (g). A comparative composition was further prepared by admixing 1 part of monoethylacetoacetatebis(acetylacetonato)aluminum with the dispersion.

The compositions obtained in Examples 9 to 14 and Comparative Examples 5 to 7 were tested for properties by the following methods.
* Storage stability: The composition was stored in a closed container as placed in a constant-temperature chamber at 30° C., and the time (hrs) taken for the composition to become so viscous as to resemble pudding was determined.
* Properties of coating: Polished soft steel panels were coated with the composition to a dry thickness of 50 μm and then allowed to stand at a temperature of 20° C. and humidity of 75% or 30% for 7 days. The coating was thereafter tested for the following properties.
* Gel fraction ratio: The same as above.
* State of coating surface: The same as above.
* Water resistance: The same as above.
* Alkali resistance: The same as above.
* Acid resistance: The same as above.
* Weather resistance: The same as above.
* Impact resistance: The same as above.
* Alcohol resistance: Determined by a spot test, i.e. by placing lauryl alcohol locally on the coating, then allowing the coating to stand at 20° C. for 24 hours and checking the state of the surface of the coating.
* Bending resistance: The same as above.

Table 2 shows the storage stability of the compositions and the properties determined by the tests of coatings cured at a humidity of 75%. Table 3 shows the test results achieved by coatings cured at a humidty of 30%.

We claim:
1. A curable composition comprising:
   (a) a nonaqueous dispersion of a particulate polymer insoluble in an organic liquid, wherein said nonaqueous dispersion of said particulate polymer is prepared by polymerization of a radical-polymerizable unsaturated monomer in a liquid phase which comprises said organic liquid and a dispersion stabilizer resin, said polymerization of the radical-polymerizable unsaturated monomer resulting in said particulate polymer which is dispersed in said liquid phase, wherein the stabilizer resin is a co-polymer consisting essentially of a hydroxyl-containing unsaturated monomer and an alkoxysilane-containing vinyl monomer which is a compound represented by the formula

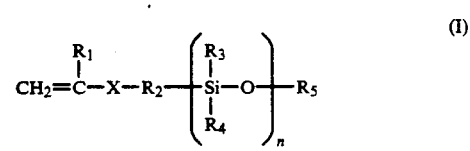

(I)

wherein X is

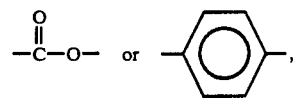

$R_1$ is a hydrogen atom or methyl, $R_2$ is a bivalent saturated aliphatic hydrocarbon group having 1 to 6 carbon atoms, $R_3$ and $R_4$ are the same or different and are each phenyl, alkyl having 1 to 6 carbon atoms or alkoxyl having 1 to 10 carbon atoms, $R_5$ is alkyl having 1 to 10 carbon atoms, and n is an integer of from 1 to 100; and
   (b) a chelate compound serving as a cross-linking curing agent admixed with the nonaqueous dispersion.
2. A composition as defined in claim 8, wherein the chelate compound is at least one member selected from the group consisting of aluminum chelate compounds, titanium chelate compounds and zirconium chelate compounds.
3. A composition as defined in claim 8, wherein the chelate compound (b) is used in an amount of about 0.1 to about 100 parts by weight per 100 parts by weight of the nonaqueous dispersion (a), calculated as solids.

TABLE 2

| Item | Example 9 | Example 10 | Example 11 | Example 12 | Example 13 | Example 14 | Comparative Example 5 | Comparative Example 6 | Comparative Example 7 |
|---|---|---|---|---|---|---|---|---|---|
| Storage stability (hrs) | 20< | 20< | 20< | 20< | 20< | 20< | 7 | 20< | 20< |
| State of coating surface | Good | Good | Good | Good | Good | Good | Shrink | Good | Good |
| Gel fraction ratio (%) | 97 | 98 | 97 | 95 | 95 | 98 | 95 | 0 | 60 |
| Water resistance | No fault | No fault | No fault | No fault | No fault | No fault | No fault | Not measurable | Blushing Blistering |
| Alkali resistance | No fault | No fault | No fault | No fault | No fault | No fault | No fault | Not measurable | Blushing Blistering |
| Acid resistance | No fault | No fault | No fault | No fault | No fault | No fault | No fault | Not measurable | Blushing Blistering |
| Alcohol resistance | No fault | No fault | No fault | No fault | No fault | No fault | No fault | Not measurable | Swelling Dissolving |
| Impact resistance (cm) | 50< | 50< | 50< | 50< | 50< | 50< | 10 | Not measurable | 40 |
| Weather resistance (hrs) | 3000< | 3000< | 3000< | 3000< | 3000< | 3000< | 1500 | Not measurable | 500 |
| Bending resistance | No fault | No fault | No fault | No fault | No fault | No fault | Crack | Not measurable | Crack |

TABLE 3

| Item | Example 9 | Example 10 | Example 11 |
|---|---|---|---|
| State of coating surface | Good | Good | Good |
| Gel fraction ratio (%) | 96 | 94 | 93 |
| Water resistance | No fault | No fault | No fault |
| Alkali resistance | No fault | No fault | No fault |
| Acid resistance | No fault | No fault | No fault |
| Alcohol resistance | No fault | No fault | No fault |
| Impact resistance (cm) | 50< | 50< | 50< |
| Weather resistance (hrs) | 3000< | 3000< | 3000< |
| Bending resistance | No fault | No fault | No fault |